United States Patent [19]

Broome

[11] Patent Number: 4,891,207

[45] Date of Patent: Jan. 2, 1990

[54] MANUFACTURE OF ARSENIC ACID

[76] Inventor: Andrew D. J. Broome, c/o Laporte Industries Ltd., Group Patent Dept., P.O. Box 2, Moorfield Road, Widnes, Cheshire, WA8 OJU, England

[21] Appl. No.: 839,530

[22] Filed: Mar. 6, 1986

Related U.S. Application Data

[63] Continuation of Ser. No. 678,839, Dec. 6, 1984, abandoned.

[30] Foreign Application Priority Data

Dec. 10, 1983 [GB] United Kingdom ................ 8333042

[51] Int. Cl.$^4$ ............................................ C01G 28/00
[52] U.S. Cl. ..................................................... 423/617
[58] Field of Search .................................. 423/617, 87

[56] References Cited

U.S. PATENT DOCUMENTS

| 4,341,743 | 7/1982 | Tebbe ..................................... 423/63 |
| 4,447,405 | 5/1984 | Ahn et al. ............................ 423/617 |

FOREIGN PATENT DOCUMENTS

| 1931826 | 1/1971 | Fed. Rep. of Germany ... 423/539 A |
| 0510430 | 4/1976 | U.S.S.R. ............................... 423/617 |
| 981226 | 12/1982 | U.S.S.R. . |
| 0858058 | 1/1961 | United Kingdom ......... 423/DIG. 6 |
| 2113194A | 8/1983 | United Kingdom . |

OTHER PUBLICATIONS

Kirk-Othmer, "Encyclopedia of Chemical Technology", 3rd Ed., vol. 13, pp. 13-15, 26 & 27.
Wallace, John G., "Hydrogen Peroxide in Organic Chemistry", (Dupont), pp. 119-121.
Interox, "Peroxygen Compounds in Organic Synthesis", part 19.
Shumb, et al., "Hydrogen Peroxide", pp. 467-468 and 478.

*Primary Examiner*—John Doll
*Assistant Examiner*—R. Bruce Breneman
*Attorney, Agent, or Firm*—Larson and Taylor

[57] ABSTRACT

Manufacture of arsenic acid by oxidation of arsenic trioxide with hydrogen peroxide is potentially hazardous, especially when making concentrated solutions of arsenic acid as sought by the users. The process also can suffer from substantial wasteful decomposition of hydrogen peroxide. The problems arise from or are exacerbated by the nature of the reactants, the exothermic character of the principal and decomposition reactions and the formation of localized hot spots.

The problems can be ameliorated by introducing the reagents with agitation into a body of reaction product and maintaining the reaction mixture at a temperature of not more than 70° C. and preferably 45° to 55° C. By carrying out the process in such a manner, it can accomodate even low grade arsenic trioxide as reagent.

14 Claims, No Drawings

MANUFACTURE OF ARSENIC ACID

This application is a continuation of application Ser. No. 678,839 filed Dec. 6, 1984, now abandoned.

The present invention relates to a process for the manufacture of arsenic acid and in particular the manufacture of an aqueous solution thereof.

In aqueous solution, arsenic acid has the formula $H_3AsO_4$. It is crystallised as a hydrate and can be progressively dehydrated by the stepwise removal of water molecules to form respectively the meta and pyro arsenic acids. Arsenic acid as such, or in dehydrated form has long been used as a biocide and as a component of a class of timber preservative products.

Hitherto, methods and proposed methods for the industrial production of arsenic acid have in many instances included the oxidation of arsenious oxide which has the formula $As_2O_3$ and which is known also by a variety of other names such as white arsenic, crude arsenic, arsenous oxide or, confusingly, simply as "arsenic". Although a range of oxidising agents has been proposed, manufacturing activity has centred upon the use of nitric acid as oxidant, together with some appropriately selected catalyst. Such a process has continued to find favour despite the known disadvantage that the reaction produces substantial volumes of gaseous nitrogen oxides, leading to foaming and boil over problems and which need a large plant to scrub them from the effluent and be oxidised to reform nitric acid. Also the process suffers from the problem of temperature control, and that such problems are exacerbated by the enforced move towards the use of lower grade arsenic trioxide starting material.

Although other methods have been proposed, these too suffer from disadvantages. Thus, for example, in GB-A-2113194, the nitric acid method is modified by using oxygen as the oxidant and nitric acid as a catalyst only in conjunction with iodide, in a pressurised reactor, but it would appear from the text that the amount of nitric acid present is critical, in that if too small an amount is present, the reaction stops prematurely whereas if excess is present the continued regeneration of iodide is suppressed, which would therefore prevent the reaction cycle to proceed in the desired manner. In view of the fact also that nitric acid can be consumed by impurities in the starting material, it will be recognised that operation of the process can readily be disrupted.

One further oxidising agent that has been proposed is hydrogen peroxide, in SU-A-510430. In this specification, the Russian Patentees describe two methods of operation using hydrogen peroxide. In the first method, 30-35% hydrogen peroxide is added dropwise or in a fine stream at 60°-70° C. into a slurry of arsenic trioxide and water which has been heated to boiling point by the bubbling through of live steam. Subsequently, cold water is added to the reaction vessel and the mixture is then slowly heated up to boiling point which is maintained for a subsequent 2-3 hours. The Russian Patentees confirmed that such a process was complex and took a long time, and suffered from the disadvantage that the hydrogen peroxide must be introduced slowly during which period strict temperature control was necessary, since disturbance of the temperature conditions could lead to an explosion. In view of the disadvantages in that process, the Russian Patentees employed, instead, hydrogen peroxide diluted to at a concentration of 10-20% concentration and they alleged that this could be employed at between 110-150% of the stoichiometric amount to oxidise the arsenic trioxide. However, even when they used pharmaceutical grade reagents, i.e. reagents free from substantial amount of impurities that would catalytically decompose hydrogen peroxide, Example 2 needed 170% of the stoichiometric amount of hydrogen peroxide and even so produced a final solution concentration of only about 30% arsenic acid. Such a product is rejected by the use industry which demands arsenic acid concentrations in the region of at least 65% and preferably 75-85% w/w for which the use of a more concentrated hydrogen peroxide reagent rather that a diluted reagent would be required. In other words, in order to satisfy the requirements of the industry, in terms of final arsenic acid concentration, any proposed hydrogen peroxide process must simultaneously avoid the dilution taught by the Russian Patentees and also ameliorate their decomposition problems whilst overcoming the control problems inherent in using concentrated hydrogen peroxide which the Patentees identify in their summary of the prior art.

In the course of investigating the reaction between arsenic trioxide and hydrogen peroxide, the inventor of the present invention carried out a series of trials. He determined that addition of commercially available arsenic trioxide to a body of a concentrated hydrogen peroxide would represent a hazardous process especially on a full size manufacturing scale since the presence from the start of the entire amount of concentrated hydrogen peroxide would not only maximise the loss due to decomposition of the hydrogen peroxide induced by impurities from the arsenic trioxide introduced, but also would thus maximise the risk of foaming, ejection of product from the reaction vessel or at worst promote an explosion. On the other hand, when concentrated hydrogen peroxide is added to the arsenic trioxide, there are once again significant safety problems, in that, at least initially, the mixture forms an extremely dense slurry that is very hard to mix, with the result that the exothermic nature of the oxidation reaction coupled with very poor heat transfer on a maufacturing scale promotes the formation of localised hot spots in which rapid decomposition of hydrogen peroxide is observable together with steam evolution and the inherent dangers associated with such peroxidic decomposition. On such a scale, the problems are exceedingly difficult to control, other than by very slow addition of the reagent. Such findings thus confirm the analysis of the prior art made by the Russian Patentees.

Accordingly, it is an object of the present invention to provide a process which is capable of making concentrated arsenic acid solution by oxidation of arsenic trioxide with hydrogen peroxide, but avoiding or ameliorating the aforementioned manufacturing difficulties.

According to the present invention there is provided a process for the manufacture of arsenic acid by reaction between arsenic trioxide and hydrogen peroxide in which the reagents are introduced with agitation into a body of fluid comprising an aqueous solution of arsenic acid, and maintaining the temperature of the reaction mixture at a temperature below 70° C. By introducing the reagents in such a manner, it is possible to ameliorate or overcome the disadvantages inherent in the prior art methods of using hydrogen peroxide and especially the disadvantages and danger that may occur when one reagent is brought directly into contact with the other reagent.

It is convenient to consider the present invention in the context of batch reactions, one especially convenient method comprising a cycle in which one batch-worth of both reagents is introduced progressively into the body of arsenic acid and permitted to react for at least a minimum reaction period and then the corresponding volume of product is withdrawn from the augmented body of aqueous arsenic acid solution. It is preferable for the body to comprise at least one batch-worth of reagents and in practice, on a manufacturing scale conveniently comprises at least 5 and often from 10-15 batches-worth of product. Conveniently this can be expressed in terms of the moles of arsenic present in the body of arsenic acid solution and moles introduced per batch of arsenic trioxide. By carrying out the process in this way, it was found that the reaction exotherm could be readily controlled, and losses of reagent by decomposition retained at acceptable levels, even with impure arsenic trioxide starting material.

Advantageously, the process of the present invention can accommodate the use of concentrated hydrogen peroxide, that is to say at least 35% w/w $H_2O_2$, preferably at least 45% w/w $H_2O_2$ and normally up to 75% w/w $H_2O_2$. Even allowing for some loss of hydrogen peroxide due to impurity-induced decomposition, it is therefore possible to produce, directly and in relative safety, an arsenic acid solution having a concentration of at least 65% and preferably in the region of 75-85% by the selection of appropriately concentrated hydrogen peroxide. In other words, the process is readily capable of producing a product having a concentration desired by the use industry. It is especially suitable to employ from 50% w/w $H_2O_2$ to 70% w/w $H_2O_2$ in that such commercial solutions are readily available and transportable.

The hydrogen peroxide solution can contain one or more stabilisers that are effective in an acidic medium, such as pyrophosphates, and/or orthophosphates, and/or organic phosphonates including hydroxy alkyl diphosphonates and amino methylene phosphonates and/or wholly organic stabilisers such as dipicolinic acid and hydroxyquinolines and phenols, optionally substituted around the aromatic nucleus by non-interfering substituents. It will be recognised that the value of including such stabilisers increases as the purity of the arsenic trioxide starting material diminishes and its particle size increases.

It is desirable to add at least a stoichiometric amount of hydrogen peroxide, based on the arsenic trioxide, namely at least 2 moles per mole of arsenic trioxide of formula $As_2O_3$. In practice, a minor proportion of the hydrogen peroxide is often consumed by side reactions or decomposition and accordingly it is preferable to employ a suitable excess amount of hydrogen peroxide in each batch. Purity is one of the factors influencing the selection of the amount of hydrogen peroxide, and a second factor is the particle size of the arsenic trioxide. It is normal for the amount of hydrogen peroxide to be selected in the range of 105% of the stoichiometric amount to 200%, in the context of an $As_2O_3$ purity ranging from above 99% down to 92%. By way of example if the starting material is rather coarse then, for high purity $As_2O_3$ starting material, it is advisable to employ from 105% to 115% of the stoichiometric amount; for the intermediate purity material around 98% purity, it is convenient often to use from 115-130% of the stoichiometric amount of hydrogen peroxide; for low grade starting material of e.g. 96-97% purity it is usually desirable to select in the range of 120-150% of the stoichiometric amount, and for really low grade material, such as below 95% purity, it is usual to employ at least 125%, and typically up to 175%. However, when more finely ground starting material is used, less hydrogen peroxide is wasted in side reactions or decomposition with a result that nearly all the arsenic present can be oxidised into solution using no more than 125% of the stoichiometric amount for any material having a purity of 90% arsenic or over, in practice often from 105 to 125%.

It will further be recognised that use of an increasing excess amount of hydrogen peroxide introduced at a given concentration translates to a dilution of the resultant arsenic acid product. Such dilution can be offset, if desired, by employing a correspondingly higher concentration of hydrogen peroxide.

It is most convenient for the arsenic trioxide to be introduced in powder form. To at least some extent there is a correlation between the efficiency of use of hydrogen peroxide for oxidising the arsenic trioxide and the particle size of the latter, smaller particles being more favoured. This can manifest itself as an overall reduced hydrogen peroxide requirement or in improved separation of arsenic from the impurities in the starting material. It is desirable for the average particle size to be below 500 micrometers, and in many instances will be at least 4 micrometers. The starting materials in many instances have such low particle sizes but if not they can be achieved by conventional grinding equipment. It will be recognised that e.g. very small particles of below 50 micrometers can form agglomerates e.g. up to 200 micrometers in size. Such agglomerates can also be used very readily in the instant process.

One important feature of the present invention is the temperature which is maintained in the reaction vessel during the introduction of the reagents and the subsequent reaction. The reaction itself is exothermic and thus it has been found in practice that a temperature of above ambient can be maintained throughout the reaction period without introduction of external heat, and indeed the mixture is typically subjected to external cooling throughout the reaction period. The rate of the reaction, is however, somewhat sensitive to temperature, and it is preferable therefore to maintain a temperature of at least 35° C. in order to maintain an acceptable rate of reaction and in many embodiments, the temperature is controlled to at least 40° C. It will be recognised that the provision of the arsenic acid body of fluid assists in the maintenance of a controlled reaction temperature in that it provides a larger volume for the dispersal of the heat of reaction, thereby, at the same time, diluting any inherent temperature rise and presenting an augmented volume for external cooling means as well as providing a more fluid medium and thus reducing heat transfer problems. By doing so, it is able to obviate or at least ameliorate problems of localised temperature build-up to above the SADT (self accelerating decomposition temperature). In practice, the reaction mixture temperature is maintained at up to 60° C., and especially at around 45° to 55° C., in order to balance the twin and opposed criteria of increasing reaction rate versus reduced safety margin. Hence increased potential throughput is balanced against an increased likelihood of the reaction passing out of control when a higher design temperature of the reaction is permitted. In practice, it will be recognised that the temperature is often controlled by balancing the cooling with the rate of introduction of in particular the aqueous hydrogen peroxide solution.

It is a further advantageous feature of the process described herein that even though the reaction temperature is preferably maintained at at least 35° C., it is normally possible to commence the reaction at markedly lower temperatures, without the provision of external heat. Thus, for example, even where the body of arsenic acid solution initially has a temperature of 0° C., introduction of the reagents can be made and within a single batch, the reaction temperature can normally be restored to the preferred temperature conditions.

In practice, the reaction is conducted by introducing the reagents simultaneously or alternatively, or aliquots of the solid reagent and continuous addition of the aqueous hydrogen peroxide into the body of arsenic acid solution until the desired amount of each has been introduced. It convenient for the reagents to be introduced over a period of from 1 to 5 hours and the overall reaction period to be selected within the range of from 2 to 10 hours, including the period during which the reactants are introduced. It will be recognised that, to at least a certain extent, the reaction period is interlinked with the reaction temperature and that should the reaction be conducted at a temperature from ambient to 35° C., proportionately longer periods of introduction and reaction time should be employed. Alternatively or by way of supplement, a sample of the reaction mixture can be analysed at intervals for residual hydrogen peroxide concentration and the product withdrawn when substantially no hydrogen peroxide remains.

In some valued embodiments, especially when the arsenic trioxide is available as or ground to a starting material in which all or most of the particles are below 500 micrometers, the process is operated according to the following combination of process conditions. A batch of particulate arsenic trioxide containing at least 92% by weight $As_2O_3$ and from 105 to 125% of the stoichiometric amount of hydrogen peroxide as an aqueous solution containing 45 to 75% w/w $H_2O_2$ introduced gradually into a body of aqueous arsenic acid containing from 5 to 15 moles As per mole As in said batch, thereby forming a reaction mixture, the reaction mixture is agitated and maintained at a temperature in the range of 40° to 60° C. for a period of at least 2 hours after introduction of the reagents commences, and thereafter a fraction of the mixture is withdrawn as product. Within that combination of conditions, the earlier identified narrower preferred ranges for any or all conditions can naturally be used.

In order to assist the reaction, and particularly in conjunction with the processing of lower grade starting material, it can be advantageous to introduce a catalytic amount of an iodide, particularly potassium iodide into the reaction mixture, typically in an amount of up to 0.2% w/w and especially in an amount from 0.01 to 0.10% w/w. In addition, it is desirable to promote wetting of the arsenic trioxide on introduction into the reaction mixture, by including, for example, a small amount of a wetting agent, typically bentonite in a total amount of up to 0.1% w/w and often from 0.01 to 0.03% w/w on the mixture. By promoting the wetting of the arsenic trioxide, the period is reduced during which it floats upon the surface of the reaction mixture where it can form localised spots from which heat dissipation is slow.

One aspect of the invention of practical importance when the reaction is carried out on a large scale is the thorough mixing of the reagents with the body of arsenic acid into which the reagents are introduced. It will be recognised that concentrated arsenic acid solutions, for example those containing over 70% w/w arsenic acid are dense, viscous fluids. Thus, there is a tendency especially for the arsenic trioxide starting material to float, at least initially, because conventionally it is in the form of a powder. When it floats it remains as a crust of small particles on the surface of the body of the reaction mixture. It is recognised that the benefit of the instant invention could be dissipated if the reagents were permitted to come into contact primarily as surface films or if hydrogen peroxide, for example, is introduced onto a surface comprising principally a crust of unreacted arsenic trioxide starting material. In consequence, it is highly advantageous for the introduction of the two starting materials to be separated, either by location or sequential addition, in both instances the body of arsenic acid product and reactant being mixed to such an extent that when it comes into contact with the second starting material, no such localised concentration of the first starting material has been permitted to remain. One particularly convenient method for effecting such a separation comprises the introduction of the two reactants into separated zones of the body of fluid, such as into separate vessels with the body of reaction mixture circulating between the two of them. In practice, such a circulating reactor system normally requires fluid to be pumped from one vessel to the other from which it is permitted to flow under gravity such as over a weir back to the first vessel and the pumping itself can provide sufficient agitation in respect of the vessel into which the aqueous hydrogen peroxide is added. In the other reaction vessel, it is preferable to incorporate a mechanical agitator that is of sufficient power and is adapted to blend the surface layer of solid particles within the main body of the fluid in that vessel.

The fluid product typically contains a residual amount of solids, part of which represent unreacted arsenic trioxide and part impurities. It is most convenient for such solids to be filtered off. Although all the body of arsenic acid could be filtered after the production of each batch, it is generally preferable to filter merely the amount of product withdrawn. It has been observed that the small amount of solid separated at this stage tends to include rather large particles compared with the average particle size of the starting material. Analysis of the solids has shown that they tend to have a lower arsenic content than that of the starting material, indicating that preferential dissolution of the arsenic has occured. Advantageously, such preferential dissolution seems, on present indications, to be noticeable with the relatively impure starting materials i.e. those in which the potential problem of impurities is greatest. In view of the foregoing, it can be advantageous not to recycle the separated solids, although where the impurity content of the product would still fall within customer-tolerated limits solids recycling can result in some further recovery of arsenic.

It is preferable for the reaction vessel to be operated at slightly sub-ambient pressure with vented gases being passed through a scrubbing system designed to remove all arsenic oxide particles and arsenic acid solution entrained in the gases. Since the primary oxidant hydrogen peroxide in the present invention is introduced in liquid form rather than as oxygen gas and does not generate substantial gaseous reaction products like nitrogen oxides, the scrubbing system need only be small scale in compounds with plants of comparable manufacturing capacity employing respectively air or nitric acid as oxidant.

Having described the invention in general terms, specific embodiments will now be described more fully by way of example only. Attention is drawn to the poisonous nature of both arsenic trioxide and arsenic acid to humans and the need therefore for appropriate safety precautions to be adopted in order to avoid contact with them.

EXAMPLES 1-7

Each of Examples 1-7 was carried out in a jacketted 60 liter stainless steel vessel fitted with agitator and temperature probe and having an offtake for product at its base. The vessel was cooled by passing mains supply water through the jacket.

In each Example, 15 liters of an aqueous arsenic acid solution having a concentration of approximately 75 to 80% w/w arsenic acid was introduced into the reaction vessel, forming the body of product into which the reactants would subsequently be introduced. In Example 1 the body comprised laboratory grade arsenic acid and in the subsequent Examples product from earlier Examples was used instead.

Initially the body of arsenic acid had a temperature of about 16° C., namely ambient temperature. Arsenic trioxide (15 kg) and a supra-stoichiometric amount of hydrogen peroxide (50% w/w, commercially available from Interox Chemicals Limited) indicated in the following Table 1 were then each introduced into the reaction vessel over a period of 3 hours, the arsenic trioxide being introduced in 30 equal aliquots and the hydrogen peroxide in a continuous stream. Bentonite (3 g, 0.02% of the total arsenic trioxide) was introduced into the reactor together with the first aliquot of arsenic trioxide.

During the course of introduction of approximately the first 10% of the reactants, the reaction vessel was agitated, but cooling water was not being circulated through the reactor jacket. During that period the temperature of the reaction mixture rose from ambient temperature to about 40° C. during the remainder of the reaction period, the cooling water was circulated at such a rate that the temperature in the vessel was maintained at 40° C.±3° C. The reaction was allowed to continue at 40° C. for a further hour after all the reagents had been inroduced and then the reactor contents were discharged and the total residual solids content of the batch determined. From this determination, the extent to which the arsenic had been converted to arsenic acid was determined and, expressed as a percentage in the following Table under the term "reaction efficiency". Naturally, allowance was made for any other solids present such as the added bentonite and any solids introduced with the original body of arsenic acid solution.

In a modification of Example 1 in Examples 3 to 7 inclusive a catalyst, potassium iodide (50, 0.1% w/w of the arsenic trioxide) was introduced together with the first aliquot of arsenic trioxide. In a further modification in Example 7 only, the reaction temperature was permitted to rise to 50° C. whereupon it was subsequently controlled to within ±3° C. by adjustment in the rate of flow of cooling water.

Periodically, samples of the liquor in the reaction vessel were taken and analysed for residual peroxide content. The reaction conditions and results are summarised in Table 1 below.

TABLE 1

| Example No. | $As_2O_3$ purity % | $H_2O_2$ addition % | Product Total solids $gl^{-1}$ | Analysis $H_3AsO_4$ % w/w | Reaction efficiency % |
|---|---|---|---|---|---|
| 1 | 99.9 | 110 | 3.7 | 78.5 | 99.3 |
| 2 | 99.9 | 110 | 4.8 | 81.0 | 99.1 |
| 3 | 94.9 | 150 | 1.0 | 74.8 | 99.8 |
| 4 | 94.9 | 120 | 5.3 | 76.6 | 99.0 |
| 5 | 94.9 | 135 | 4.6 | 75.1 | 99.1 |
| 6 | 99.1 | 120 | 6.8 | 80.0 | 98.7 |
| 7 | 99.1 | 120 | 2.6 | 84.0 | 99.5 |

From Table 1 above, it will been seen that using the method of the instant invention, it was possible to readily obtain an arsenic acid concentration of around 75% or higher even from starting material as impure as below 95% arsenic trioxide. Thus, it will be observed that with all grades, a reaction efficiency of over 99% was attainable and from a consideration of the total solids content it can be also be seen that not all of the impurities went into solution. By a comparison of Examples 1 and 2 with subsequent Examples 3 to 5 and 6/7, it will be recognised that there is a broad correlation between purity of the arsenic trioxide starting material and the amount of hydrogen peroxide required for virtually complete oxidation. By comparison, it will be recalled that Example 2 of SU-A-510430 with pharmaceutical grade $AS_2O_3$ needed 175% of the stoichiometric amount of hydrogen peroxide and even then could produce a concentration of only 29%. It will also be observed by comparison between Examples 6 and 7 that increasing the reaction temperature from 40° to 50° enhanced both the reaction efficiency and reduced the total solids content in the product liquor.

By way of comparison, further experiments were conducted into the reaction between hydrogen peroxide and arsenic trioxide in which the reactants were brought directly into contact with each other, and not indirectly through separate introduction into a body of the reaction product. These further experiments were conducted using an intermediate grade of arsenic trioxide containing 97.2% w/w $As_2O_3$. In view of the increased hazard when employing such a technique, they were carried out on a smaller scale, as follows. A predetermined amount of hydrogen peroxide, 150% of the stoichiometric amount and at 35% w/w solution, was introduced into a round bottom flask equipped with a stirrer and then over a period of 3 hours 50 gms of arsenic trioxide was introduced slowly together with 0.01 g bentonite. The temperature was maintained at 40° C. After all the arsenic trioxide had been introduced, the reactants were allowed to react for a further 1 hour at the reaction temperature. The product was analysed as in the Examples. At the end of the reaction it was found that only 96.5% oxidation to arsenic acid had occurred, with a peroxide residual equivalent to 3% of the stoichiometric amount. The reactants were modified by also adding potassium iodide as catalyst. In the presence of 0.1% w/w and 0.5% w/w potassium iodide, the extent of oxidation was increased to respectively 97.8% and 96.9% with peroxide residuals of 3% of the stoichiometric amount and 0.3% of the stoichiometric amount. Increasing the reaction temperature to 50° C. also produced a 96.9% oxidation but with no residual peroxide. It is readily apparent that this technique was substantially more wasteful in terms of peroxide decomposition than the technique according to the present invention.

EXAMPLES 8 TO 13

Each of these small scale Examples was carried out using a very low grade arsenic trioxide starting material containing 70.15% arsenic, calculated as the metal, equivalent to 92.6% as $As_2O_3$, (50 g) and 50% w/w aqueous hydrogen peroxide at 150% or 175% of the stoichiometric amount. In Examples 8 and 9, the arsenic trioxide had been previously ground to a particle size of below 710 micrometers and in Examples 10 to 13 to below 425 micrometers.

In each of these Examples a body of arsenic acid solution (82.7% w/w, 105 g) was introduced into a glass vessel equipped with a stirrer and a baffle, separating the point of introduction of the two reagents subsequently. During the next three hours, arsenic trioxide was introduced with stirring at approximately evenly spaced intervals in aliquots of about 0.5 g, and the hydrogen peroxide was pumped in a constant rate. Additionally, 0.1% w/w KI and 0.02% w/w bentonite was introduced with the first aliquot of arsenic trioxide. The temperature of the reaction mixture was held at 50° C. during the introduction but during the subsequent period of an hour cooling to around 40° C. was observed. The product was then filtered, the solid residue analysed and the % of arsenic that had been oxidised was calculated.

The results are summarised in Table 2, the arsenic content in the residue being calculated as $As_2O_3$ and the impurity content being the balance and thus including any undissolved K and bentonite.

TABLE 2

| Example No. | $H_2O_2$ Addition % | Solid Residue | | | % of arsenic oxidised |
|---|---|---|---|---|---|
| | | Total weight g | Arsenic Content g | Impurity Content g | |
| 8 | 175 | 6.6 | 3.4 | 3.2 | 92.9 |
| 9 | 150 | 5.9 | 3.4 | 2.5 | 92.9 |
| 10 | 175 | 4.4 | 1.7 | 2.7 | 96.4 |
| 11 | 150 | 4.0 | 1.2 | 2.8 | 97.4 |
| 12 | 125 | 3.4 | 0.8 | 2.6 | 97.7 |
| 13 | 110 | 3.8 | 0.9 | 2.9 | 97.6 |

From Table 2, it can been seen clearly that the solid residue contains a much higher proportion of the impurities than did the starting material indicating preferential solubilisation of the arsenic. Secondly, it will be noted that the smaller particle size of Examples 10 to 13 led to improved arsenic oxidation whilst leaving a similar amount of impurities as solid residue.

I claim:

1. A process for the manufacture of aqueous arsenic acid having a concentration of at least 65% by weight by reaction between arsenic trioxide and aqueous hydrogen peroxide, the process comprising introducing arsenic trioxide and a solution containing 35% to 75% w/w hydrogen peroxide with agitation into a body of fluid, said $H_2O_2$ being present in an amount sufficient to provide up to 125% of the stoichiometric amount of hydrogen peroxide required to convert all of the arsenic trioxide present to arsenic acid, said body of fluid into which the reagents are introduced comprising an aqueous solution of arsenic acid having a concentration of at least 65% by weight and comprising at least half the volume of the mixture after all the reagents have been introduced thereinto, and maintaining the temperature below 70° C., to effect reaction between said arsenic trioxide and hydrogen peroxide to form in said body of fluid as a reaction product of the reaction an aqueous product solution comprising arsenic acid having a concentration of at least 65% by weight.

2. A process according to claim 1 in which the arsenic trioxide has a purity of at least 90% w/w.

3. A process according to claim 1 in which the reaction mixture is controlled to a temperature of 35° C. to 60° C.

4. A process according to claim 3 in which the reaction mixture is controlled to a temperature of 45° C. to 55° C.

5. A process according to claim 1 in which the amount of hydrogen peroxide introduced is selected inversely to the purity of the arsenic trioxide.

6. A process according to claim 1 in which the reaction period lasts 2 to 10 hours after introduction of the reagents commences.

7. A process according to claim 1 comprising gradually introducing a batch of particulate arsenic trioxide containing at least 92% by weight $As_2O_3$ and an aqueous solution of hydrogen peroxide containing 45 to 75% w/w $H_2O_2$ into a body of fluid comprising aqueous arsenic acid containing from 5 to 15 moles As per mole As in said batch, thereby forming a reaction mixture, agitating the reaction mixture, maintaining the reaction mixture at a temperature in the range of 40° to 60° C. for a period of at least 2 hours after introduction of the reagents commences, and thereafter withdrawing a fraction of the mixture as product.

8. A process according to claim 1 or 7 in which the two reagents are introduced simultaneously into two zones of the body of fluid which are then brought into contact.

9. A process according to claim 8 in which the body of fluid is recycled between the zones.

10. A process according to claim 1 employing up to 0.5% w/w based on the arsenic trioxide starting material of an oxidation catalyst.

11. A process according to claim 1 in which up to 0.5% w/w based on the arsenic trioxide starting material of wetting agent is introduced therewith.

12. A process according to claim 10 wherein said catalyst comprises potassium iodide.

13. A process according to claim 11 wherein said wetting agent comprises bentonite.

14. A process for the manufacture of aqueous arsenic acid having a concentration of at least 65% by weight by reaction between arsenic trioxide and aqueous hydrogen peroxide, the process comprising introducing arsenic trioxide having a purity below 95% and a solution containing 35% to 75% w/w hydrogen peroxide with agitation into a body of fluid, said hydrogen peroxide being present in an amount sufficient to provide up to 175% of the stoichiometric amount of hydroen peroxide required to convert all of the arsenic trioxide present to arsenic acid, said body of fluid into which the reagents are introduced comprising an aqueous solution of arsenic acid having a concentration of at least 65% by weight and comprising at least half the volume of the mixture after all the reagents have been introduced thereinto, and maintaining the temperature below 70° C., to effect reaction between said arsenic trioxide and hydrogen peroxide to form in said body of fluid as a reaction product of the reaction an aqueous product solution comprising arsenic acid having a concentration of at least 65% by weight.

* * * * *

UNITED STATES PATENT AND TRADEMARK OFFICE
CERTIFICATE OF CORRECTION

PATENT NO.   : 4,891,207
DATED        : January 2, 1990
INVENTOR(S)  : BROOME, Andrew D. J.

It is certified that error appears in the above—identified patent and that said Letters Patent is hereby corrected as shown below:

The name of the assignee in item [73] of the title page is inserted to read as follows:

[73] INTEROX CHEMICALS LIMITED
London, England

Signed and Sealed this

Sixteenth Day of April, 1991

Attest:

HARRY F. MANBECK, JR.

Attesting Officer

Commissioner of Patents and Trademarks